United States Patent [19]

Ahrens et al.

[11] Patent Number: 4,816,079

[45] Date of Patent: Mar. 28, 1989

[54] PROCESS FOR CONTINUOUS CRYSTALLIZATION OF DEXTROSE MONOHYDRATE

[75] Inventors: Karl-Heinz Ahrens, Elsdorf; Georg Osthaus, Korschenbroich, both of Fed. Rep. of Germany

[73] Assignee: Fried Krupp GmbH, Fed. Rep. of Germany

[21] Appl. No.: 934,898

[22] Filed: Nov. 25, 1986

[30] Foreign Application Priority Data

Nov. 25, 1985 [DE] Fed. Rep. of Germany ....... 3541576

[51] Int. Cl.$^4$ .............................................. C13F 1/02
[52] U.S. Cl. ...................................... 127/60; 127/16; 127/62; 127/53; 127/61
[58] Field of Search ................... 23/295, 301; 127/16, 127/61, 62, 60, 56, 55, 53

[56] References Cited

U.S. PATENT DOCUMENTS

| | | | |
|---|---|---|---|
| 3,257,665 | 6/1966 | Idaszak | 127/60 |
| 3,406,046 | 10/1968 | Van Tittelboom | 127/60 |
| 3,682,447 | 8/1972 | Zucker et al. | 127/61 |
| 3,709,731 | 1/1973 | Kingma | 127/62 |
| 4,357,172 | 11/1982 | Edwards | 127/60 |
| 4,620,880 | 11/1986 | Bodele et al. | 127/60 |

FOREIGN PATENT DOCUMENTS 1498186  1/1978  United Kingdom ................. 127/61

*Primary Examiner*—Asok Pal
*Attorney, Agent, or Firm*—Sughrue, Mion, Zinn, Macpeak & Seas

[57] ABSTRACT

A process for continuous dextrose-monohydrate crystallization whereby an evaporated concentrated liquor is mixed with a recirculated dilute phase to form a feeding liquor. At least a portion of this feeding liquor is fed through the shearing zone of a homogenizer. The sheared mother liquor is then fed to a vertical cooling-crystallizer to form a suspension. The suspension is separated into a concentrated phase and a dilute phase. The dilute phase separated from the suspension is employed as the dilute phase which is mixed with the evaporated concentrated liquor.

12 Claims, 2 Drawing Sheets

PROCESS FOR CONTINUOUS CRYSTALLIZATION OF DEXTROSE MONOHYDRATE

BACKGROUND OF THE INVENTION

The present invention relates to a process for continuous crystallization of dextrose monohydrate from a mother liquor in which nucleation and growth of the nuclai are separated form each other and in which the crystal seeds are crystallized out by cooling crystallization and the crystals are separated for the mother liquor.

In conventional process for producing dextrose monohydrate, a thinned starch having a solids content of about 30 to 35 weight percent is hydrolyzed to dextrose (saccharification) by glucoamylase in a large agitated tank known as an enzyme convertor or reactor at a temperature of about 55° to 60° C. for about 48 to 96 hours to convert the starch to about 95 to 96% dextrose. After saccharification, the hydrolysate is usually clarified by centrifugation or precoat filtration to remove traces insoluble fat, protein and starch, and then is decolorized, as by treatment with powdered carbon, granular carbon or ion-exchange resins. The decolorized liquor then is evaporated to about 50 to 55% solids and may be given a second carbon treatment. For production of dextrose monohydrate, the decolorized liquor is evaporated under reduced pressure to a syrup containing 70 to 78 weight percent solids and then is cooled and passed to crystallizers. The common form of crystallizer used in the crystallization of dextrose monohydrate is a horizontal cylindrical tank fitted with a slowly turning agitator, cooling jacket, and cooling coils. A substantial bed of seed crystals comprising about 20 to 25 weight percent of the previous batch is left in the crystallizer and the syrup, at about 46° C., is mixed with the seed crystals giving an initial temperature of about 43° C. The agitated mass is slowly cooled to about 20° to 30° C. over a period of days. By then, about 60 weight percent of the dextrose has crystallized as the monohydrate in a form suitable for separation and washing, which is generally performed in perforated-screen centrifuge baskets.

Until now, dextrose-monohydrate crystallization processes have been discontinuous and required between 48 to 80 hours for total crystallization. In these known processes, the bed of crystal seeds in an amount of 20 to 25% of the weight of the previous batch is left in the crystallizer in order thereby to achieve a crystallization in which the crystal phase that is formed is as homogeneous as possible and corresponds to that of the seed and has only a small percentage of needles. The grain fraction obtained by discontinuous crystallization, nevertheless, includes a large range diameters. There is, furthermore, the danger of so-called "needle crystallization" in case of supersaturation as a result of excessive cooling. Moreover, the crystalline fraction can be seperated from the mother liquor only with great difficulty and with great loss of yield.

SUMMARY OF THE INVENTION

An object of the present invention is to provide an improved process for crystallization of dextrose monohydrate from a mother liquor in which the cooling-crystallization time is significantly reduced and a narrower and better defined grain distribution is achieved which has characteristics, which are more suitable for separation from the mother liquor, which means fewer instances of inappropriate grains.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for continuous dextrose-monohydrate crystallization in which nucleation and growth of the nuclei are separated from each other and in which crystal nuclei are crystallized out by cooling-crystallization and crystals are separated from a mother liquor comprising: (a) mixing an evaporated concentrated liquor containing dextrose with a dilute phase, the dilute phase having been removed from a separator, to form a feeding liquor; (b) feeding at least a portion of the feeding liquor to a shearing zone in a homogenizer; (c) feeding the sheared feeding liquor to a vertical cooling-crystallizer to form a suspension containing crystals; (d) feeding the suspension to a separator; (e) separating the suspension into a dilute phase and a concentrated phase; and (f) feeding the dilute phase separated in step (e) to the evaporated concentrated liquor in step (a) as the dilute phase which is mixed with the evaporated concentrated liquor.

In the process of the present invention, either the entire feeding liquor or a part of the feeding liquor is fed to the homogenizer in which the feeding liquor is subjected to an alternating shearing and pressure zone. When a portion of the feeding liquor is fed to the homogenizer, the feeding liquor first is separated into a first partial stream which is fed to the homogenizer and a second partial stream which is not fed to the homogenizer. The second partial stream which is not fed to the homogenizer preferably is fed through a static mixer, and then is reunited with the first partial stream and is sent to the vertical cooling-crystalliner.

When the feeding liquor is divided into two partial streams the first partial stream preferably comprises between 5 and 95% by volume, and most preferably between 10 and 50%, of the volume of the feeding liquor.

The evaporated concentrated liquor created by the evaporation process has a certain degree of supersaturation which, as such, should be sufficient to produce nucleation after a sufficient period of time. In accordance with the present invention, the addition of the cold dilute phase to the evaporated concentrated liquor improves nucleation conditions. Moreover, feeding a partial stream or the entire stream of the feeding liquor formed from the evaporated concentrated liquor and the dilute phase through the shearing zone of the homogenizer, allows nucleation to take place there. The strong shearing forces in the homogenizer, because of the geometrics of the tools with the numerous pressure-creating and pressure-releasing sequences, cause an increase in concentration, in smallest volumes of the type which is also known from the effect of ultrasonics in other crystallization processes, and thereby further supersaturation. A large number of homogeneous, that is to say nuclei of uniform size as a basis of uniform-crystal-size, are formed.

By the process of the present invention, a spatial and a temporal separation of the crystallization steps is achieved. Specifically, there is a separation of nucleation from the crystal growth phases, and in a preferred embodiment of the invention there is a separation as well of both the first and the second crystal-growth phases from each other. The process of the present invention not only results in a considerable shortening of crystallization time to a total crystallization time between 8 and 24 hours instead of 48 ... 80 hours, but also in particularly effective nucleation as a result of the alternating pressure increase and decrease and therefore supersaturation in the homogenizer, which in turn leads to a homogeneous grain size distribution for the dextrose grains. This homogeneous grain size distribution expedites contrifugal separation of the crystals and the mother liquor.

If the homogenized mixture is sent to the vertical cooling-crystallizer in a vertical stream from bottom to top through the crystallizer, with the crystallizer being equipped with cooling coils and stirring paddles which are located between the cooling coils, then the rotational speed of the paddles and the temperature profil of the whole unit causes an exponential increase of the crystal growth rate.

The vertical, cylindrical cooling-crystallizer is equipped with several segments of cooling coils whereby a stirrer in the gaps always provides for mixing the suspension and also serves to keep the temperature profile between 20° to 50° C. uniform.

The vertical cooling-crystallizer creates a zone of equilibrium following the nucleation zone, for the first crystal-growth phase whereby the cooling temperature is chosen in such a way that the cooling-velocity for the interface reactions is optimal for the crystal growth rate.

The homogenizer has a significant effect on nucleation. Preferably, the mixture is exposed to high energy in the shearing and pressure zone of the homogenizer for a period of 0.01 to 2.0 seconds.

The nucleation is favored by mixing the dilute phase into the evaporated concentrated liquor to form a mother liquor in front of the homogenizer since thereby a desired supersaturation takes place. The growth of the nuclei to crystals in the first growth phase occurs after the mother liquor leaves the homogenizer.

Preferable, separation of the major part of the crystals which are created occurs in an artificial gravitational field, such as a centrifuge.

In one preferred embodiment of the present invention, the concentrated phase from the separator is fed to a second vertical cooling-crystallizer, and then to a continuously operating centrifuge.

It is to be understood that both the foregoing general description and the following detailed description are exemplary and explanatory, but are not restrictive of the invention.

DETAILED DESCRIPTION OF THE INVENTION

Figure 1:
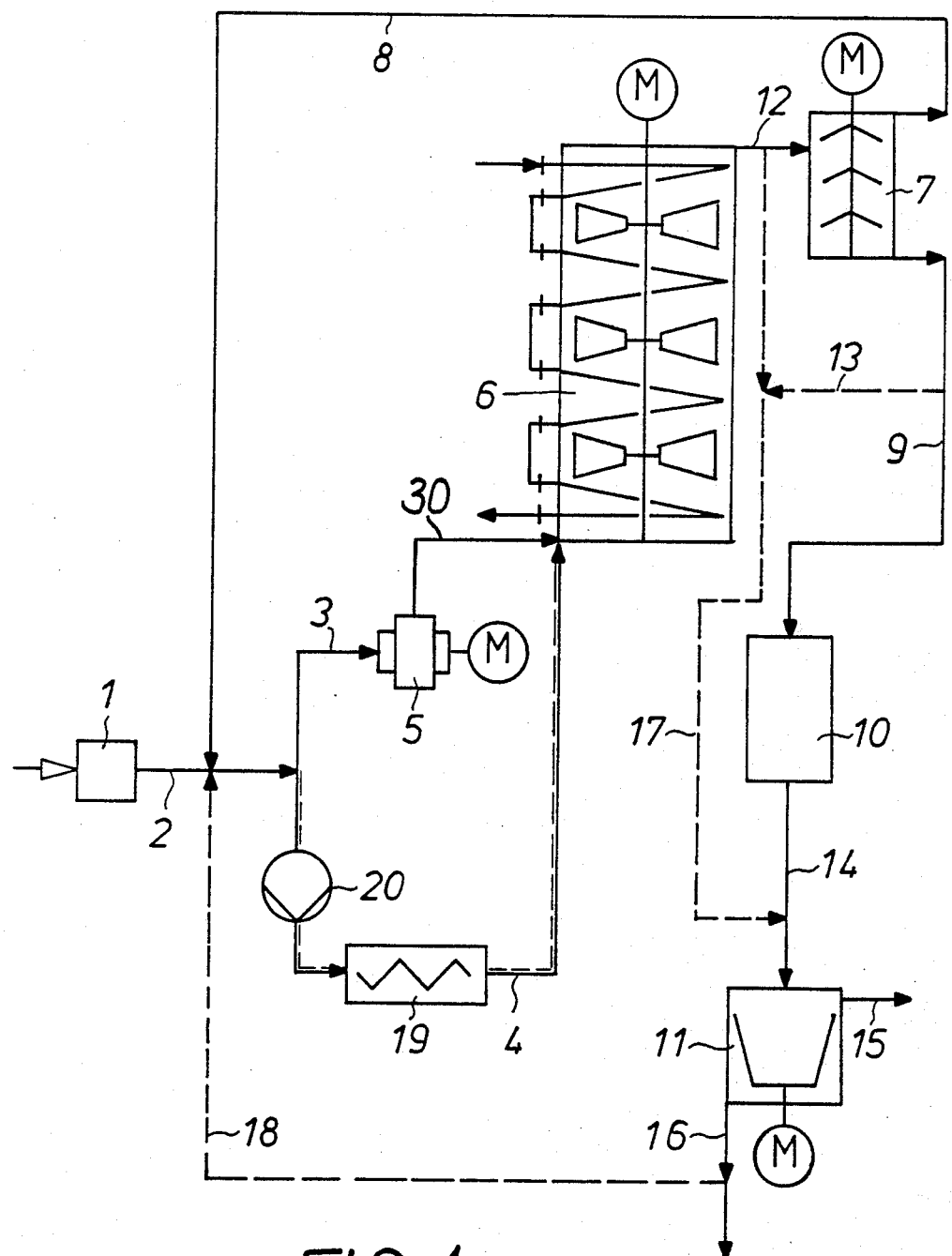
FIG. 1 is a front schematic view showing one embodiment of a process scheme for practicing the present invention.

In the present invention, an evaporated concentrated liquor is mixed which a dilute phase to form a feeding liquor. The evaporated concentrated liquor which can be employed in the present invention preferably is a decolorized dextrose liquor resulting from the saccharification of a thinned starch and which has been evaporated to a solids content of from about 50 to 85 weight percent, preferably 70 to 80 weight percent. The dilute phase which is mixed with the evaporated concentrated liquor is a phase which is formed in a latter part of the process and which then is sent (recycled) to the evaporated concentrated liquor.

In the practice of the invention, about 0 to 100 parts, preferably 80 to 95 parts, by weight of the dilute phase are mixed with about 0 to 100 parts, preferably 50 to 100 parts by weight of the evaporated concentrated liquor to form the feeding liquor.

The evaporated concentrated liquor generally has a temperature of about 60° to 80° C., the dilute phase generally has a temperature of about 25° to 35° C., and the feeding liquor generally has a temperature of about 43° to 55° C.

In the present invention, at least a portion of the feeding liquor is sent to a homogenizer where it is subjected to shearing. The feeding liquor preferably is exposed to the shearing zone of the homogenizer for a period of 0.01 to 2.0 seconds.

In one embodiment of the present invention, all of the feeding liquor is sent to the homogenizer. In another embodiment of the present invention, only a portion of the feeding liquor is sent to the homogenizer. When only a portion of the feeding liquor is sent to the homogenizer, the feeding liquor is divided into a first partial stream which is fed to the homogenizer and a second partial stream which is not sent to the homogenizer. The first partial stream generally comprises between 5 and 95%, preferably between 10 and 50%, of the volume of the feeding liquor. The second partial stream that is not fed to the homogenizer preferably is passed through a static mixer, and then is reunited and mixed with the sheared first partial stream.

In the present invention, the sheared feeding liquor is fed to a vertical cooling-crystallizer. The sheared feeding liquor which is fed to the vertical cooling-crystallizer is either the entire feeding liquor formed by the mixing of the concentrated evaporated phase and the dilute which has passed through the homogenizer, or the reunited feeding liquor comprised of the reunited first and second partial streams. The liquor is fed vertically through the crystallizer from the bottom to the top of the crystallizer. The crystallizer is equipped with cooling coils and stirring paddles which are between the cooling coils. During passage of the liquor through the vertical cooling-crystallizer, as suspension is formed which contains dextrose monohydrate crystals that growth from the nuclei.

The suspension emerges from the top of the vertical crystallizer and is sent to a separator where the suspension is separated into a dilute phase which is removed from the top of the separator and a concentrated phase which is removed from the bottom of the separator. The dilute phase removed from the separator is used as the dilute phase which is mixed with the evaporated concentrated liquor. The concentrated phase removed from the separator can be sent to a second cooling-crystallizer, preferably a vertical cooling-crystallizer as used for the 1. crystallization, where it passes through from the bottom to the top and where further crystallization takes place. The concentrated phase emerges from the second cooling-crystallizer and then is sent to a continuously operating centrifuge which separates the crystals from the liquor. The separated crystals are the desired product. The mother liquor which is separated in the centrifuge is a spent liquor and constitutes a dilute phase and can be mixed with the evaporated concentrated liquor to form the feeding liquor which is sent to the homogenizer.

In an alternate embodiment of the present invention, the concentrated phase which is removed from the bottom of the separator is not sent to a second vertical cooling-crystallizer, but is sent directly to the centrifuge where it is separated into crystal product and a spent liquor which is a dilute phase which can be returned and mixed with the evaporated concentrated liquor to form the feeding liquor which is sent to the homogenizer.

In still another embodiment of the present invention, the suspension which emerges from the first vertical cooling-crystallizer can be sent directly to the centrifuge where it is separated into crystal product and a spent liquor which is a dilute phase which can be returned and mixed with the evaporated concentrated liquor to form the feeding liquor which is sent to the homogenizer.

In the present invention, a major portion of the crystals that are separated from the suspension in an artificial gravitational field, that is, in a centrifuge. The process of the present invention operates continuously, that is, the whole operation is carried out on a continuous basis.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE

A dextrose solution to be processed is evaporated in an evaporator 1 and leaves the evaporator through a pipe 2 as evaporated concentrated liquor. A dilute phase from a separator 7 is conveyed through a pipe 8 and mixed into this evaporated concentrated liquor to form a feeding liquor. The feeding liquor is then divided into two partial streams. A first partial stream is fed through a pippe 3 into a homogenizer 5 which has rapidly rotating shearing zone. The first partial stream is then sent to the bottom of a vertical cooling-crystallizer 6 via a pipe 30. The second partial stream is sent to a pump 20 and a static mixer 19 and then through a pipe 4 to the bottom of vertical cooling-crystallizer 6 where it is reunited with the first partial stream. The suspension created in crystallizer 6 leaves the top of the crystallizer through a pipe 12 and is sent to separator 7 where the suspension is separated, as by gravity, into a dilute phase and a concentrated phase. The dilute phase, as previously described, is recirculated to the evaporated concentrated liquor through pipe 8. The concentrated phase is passed to a second cooling-crystallizer 10 by a pipe 9 and is fed from there by a pipe 14 to a continuously operating centrifuge 11 from where the crystals are withdrawn through a pipe 15. The spent liquor that has been thrown off in centrifuge 11 leaves centrifuge 11 through a pipe 16. The spent liquor can be returned as a dilute phase to the evaporated liquor by a pipe 18.

The concentrated phase from separator 7 can also be fed to centrifuge 11 directly by way of pipe 13 to separate it into crystals and a spent liquor which can be returned to the concentrated evaporated liquor.

It is also conceivable to feed to suspension by a pipe 17 directly from crystallizer 6 into centrifuge 11 and to return the thrown-off spent liquor by way of pipe 18 into the evaporated concentrated liquor.

Figure 2:
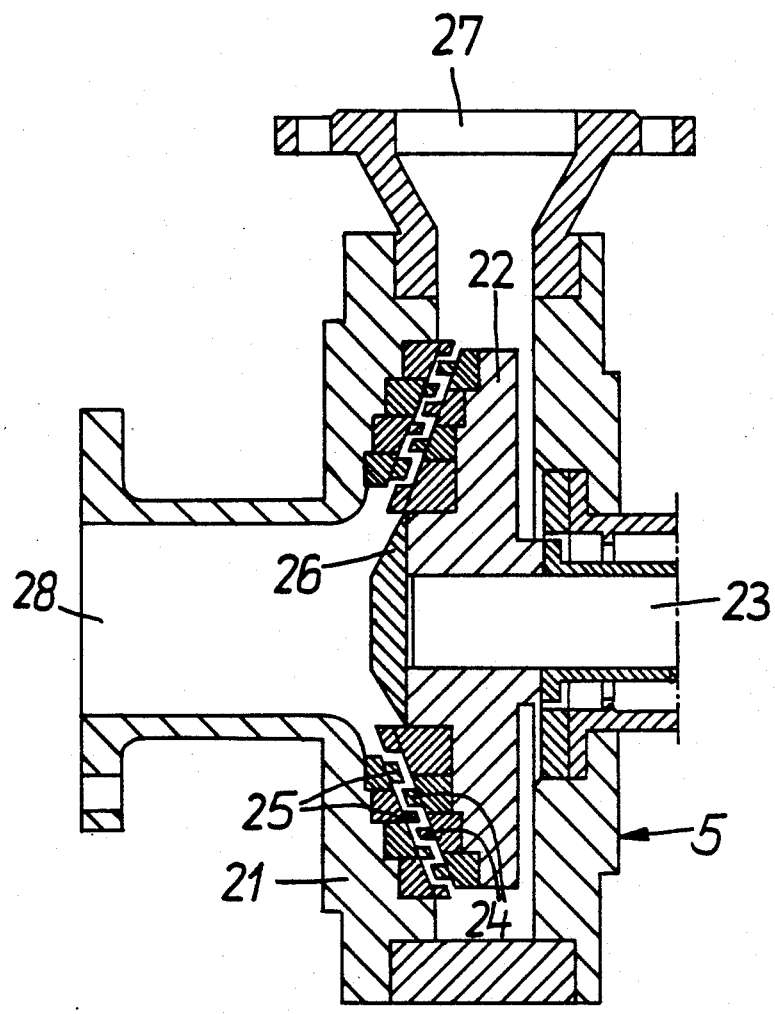
FIG. 2 is a cross-sectional view showing one embodiment of a homogenizer which can be used in the practice of the present invention.

Referring now to FIG. 2, the homogenizer 5 comprises a housing 21 and, rotatable in it, a frusto-conical rotor 22 provided with a deflecting plate 26. A shaft 23 drives the rotor 22. The rotor shaft 23 is sealed off from the housing in order to prevent the escape of liquid.

Rotor 22 is in the shape of a truncated cone and coaxial rings 24 with stepped diameters are secured to its outer surface. The rings 24 define slits between themselves and similar coaxial rings 25 which are fixes to the inner conical wall of the housing opposite rotor 22. Rings 24 and 25 create in the radial direction a meandering path for the mother liquor passing through the homogenizer. Moreover, as rotor 22 rotates about the shaft 23, highly-efficient shearing of the feeding liquor takes place. Housing 21 has an outlet opening 27 and an inlet opening 28.

The feeding liquor is expediently introduced into the center of the homogenizer, whereby as sheared liquor is obtained in which particularly effective nucleation takes place. By use of the above homogenization technique, special advantages are obtained which appear to be due to the fact that the feeding liquor is subjected to shearing in a zone of high density of shear and cavitation forces, that means a zone of high compression forces.

It will be understood that the above description of the present invention is susceptible to various modifications, changes and adaptations, and the same are intended to be comprehended within the meaning and range of equivalents of the appended claims.

What is claimed is:

1. Process for continuous dextrose-monohydrate crystallization in which nucleation and growth of dextrose-monohydrate nuclei are separated from each other, and in which the crystal nuclei are crystallized out by cooling-crystallization and crystals are separated from a mother liquor comprising:
   (a) mixing an evaporated concentrated liquor containing dextrose with a dilute phase, the dilute phase having been removed from a separator or a centrifuge to form a feeding liquor.
   (b) feeding at least a portion of the feeding liquor to a shearing zone in a homogenizer,
   (c) exposing the feeding liquor to that shearing zone for a period of 0.01 to 2 seconds, to bring about nucleation in the homogenizer,
   (d) feeding the sheared feeding liquor to a vertical cooling-crystallizer to form a suspension containing crystals,
   (e) feeding any non-sheared portion of the feeding liquor to the same crystallizer which is used in step (d),
   (f) feeding the suspension to a separator,
   (g) separating the suspension into a dilute phase and a concentrated phase in the separator, and
   (h) feeding the dilute phase separated in step (g) to the evaporated concentrated liquor in step (a) as the dilute phase which is mixed with the evaporated concentrated liquor.

2. Process in accordance with claim 1, wherein all the feeding liquor formed in step (a) is fed to the homogenizer.

3. Process in accordance with claim 1, wherein the feeding liquor formed in step (a) is divided into a first partial stream which is fed to the homogenizer and a second partial stream which is not fed to the homogenizer.

4. Process in accordance with claim 3, wherein between 5 and 95% of the volume of the feeding liquor is fed into the homogenizer.

5. Process in accordance with claim 3, wherein between 10 and 50% of the volume of the feeding liquor is fed into the homogenizer.

6. Process in accordance with claim 1, wherein the homogenizer comprises a housing, a truncated cone-shaped rotor turning in the housing, an outside surface of the rotor having a plurality of coaxial rings with graduated diameters, each of which rings is located in a gap created by a plurality of coaxial rings which have graduated diameters and which are on an inside housing wall which faces the rotor.

7. Process in accordance with claim 3, wherein the second partial stream that is not fed to the homogenizer, is fed through a static mixer, and then is reunited with the first partial stream after the first partial stream has passed through the homogenizer and is fed to the vertical cooling-crystallizer.

8. Process is accordance with claim 1, wherein the feeding liquor which is fed to the vertical cooling-crystallizer is fed vertically from bottom to top through the crystallizer.

9. Process in accordance with claim 8, wherein the vertical cooling-crystallizer is equipped with cooling coils and stirring paddles which are between the cooling coils.

10. Process in accordance with claim 1, wherein a major part of the crystals which are created are separated from the suspension in an artificial gravitational field.

11. Process in accordance with claim 1, wherein the concentrated phase from the separator is sent ot a second vertical cooling-crystallizer and then to a continuously operating centrifuge.

12. Process in accordance with claim 3, wherein the second partial stream that is not fed to the homogenizer is fed to the vertical cooling-crystallizer.

* * * * *